Patented Nov. 22, 1927.

1,650,577

UNITED STATES PATENT OFFICE.

PAUL G. WILLETTS, OF BERLIN, CONNECTICUT, ASSIGNOR TO HARTFORD-EMPIRE COMPANY, OF HARTFORD, CONNECTICUT, A CORPORATION OF DELAWARE.

ZIRCONIA-FACED REFRACTORY.

No Drawing.   Application filed January 20, 1926.   Serial No. 82,400.

My invention relates to refractories and it has special reference to refractory blocks and other refractory bodies provided with facings of zirconium oxid.

The object of my invention is to provide an improved refractory for contact with molten glass and for other purposes, having a facing composed of zirconium oxid integrally united to a body or backing of fire clay, glass-tank block material, or other suitable refractory material.

Another object of my invention is to provide an improved refractory body having a facing of zirconium oxid united by dry-pressing with a backing body of another refractory material.

In making a refractory block according to my present invention, I place a layer of zirconium oxid in the bottom of a suitable mold. Upon this layer I place another layer composed of zirconium oxid mixed with an equal proportion, or other suitable proportion, of the refractory backing material to be employed. Above this second layer I place sufficient fire clay or other selected refractory material to complete the block, and I then apply heavy pressure, suitably by hydraulic means, to compact the contents of the mold. The result of this operation is that the facing or zirconium oxid is intimately attached to and formed integral with the refractory backing body through a blending layer composed of both materials. The facing cannot be removed from the backing, because the material of the backing and the material of the facing are partially interpenetrated with each other. All of the materials mentioned should be ground to such fineness as is suitable for dry-pressing.

For example, an eight-inch flux block for glass tanks may be made by this method, having the surface which is to be exposed to the interior of the glass tank consisting of a layer of zirconium oxid one-inch thick, and with the intermediate or blending layer of mixed zirconium oxid and backing another inch in thickness, the remaining six inches being composed of the backing.

The material, when dry-pressed, should contain not over 12% of water. 5% or 6% of water in the mixture is sufficient to render the articles rigid and self-sustaining when pressed under hydraulic pressure of the order of two tons per square inch. The pressed blocks or other articles may be burned, if desired, to increase the rigidity of the backing. The burning temperature may be of the order of 2000° F.

Any refractory composition that is now commonly used for fire bricks, glass-tank blocks and other general refractory purposes may be used as the body of the blocks and other articles made according to my invention. I may also use special refractory mixtures, but the precise nature of the backing material is not an essential feature of the present invention.

A glass tank block faced with zirconium oxid has the advantage that the facing is not readily attacked by molten glass and the facing thus protects the body of the block and gives the block long life in service.

A dry-pressed refractory body of the kind described above has low heat conductivity and, therefore, blocks of this kind are, to a considerable degree, self-insulating.

My invention is not limited to the backing materials mentioned herein, nor to the production of any particular shapes.

I claim as my invention:

1. A refractory body having a facing of substantially pure zirconium oxid that is partially interpenetrated with said body and is therefore united integrally therewith.

2. A refractory body having a facing of zirconium oxid united to a backing material by an intermediate layer composed of zirconium oxid and the backing material.

3. A refractory body having a facing of zirconium oxid united by dry-pressing to a backing body of refractory material.

4. A refractory body having a facing of zirconium oxid united by dry-pressing to a backing body of refractory material through an intermediate layer of mixed zirconium oxid and the material of said backing body.

Signed at Hartford, Conn., this 31st day of December, 1925.

PAUL G. WILLETTS.